United States Patent Office 3,313,723
Patented Apr. 11, 1967

3,313,723
SELECTIVE SOLVENT FOR UNSATURATED
HYDROCARBONS
Herman S. Bloch, Skokie, and Richard C. Wackher, Palatine, Ill., assignors to Universal Oil Products Company, Des Plaines, Ill., a corporation of Delaware
No Drawing. Filed Nov. 12, 1964, Ser. No. 410,797
8 Claims. (Cl. 208—325)

This invention relates to the separation of organic compounds having different degrees of saturation and more particularly to a novel solvent therefor and to a process using the same.

The invention is particularly applicable to the treatment of hydrocarbon fractions which, as usually recovered from various sources, contains saturated and unsaturated hydrocarbons. For example, normally liquid products of a cracking process contain olefins, aromatics, paraffins and naphthenes. Similarly, products recovered by distillation of crude oil contains paraffins, naphthenes, aromatics and in most cases a small amount of olefins. Likewise, normally gaseous products of a cracking process contain olefinic gases such as propylene and butylenes and paraffinic gases such as propane and butanes.

It is an object of this invention to provide a method for the separation of mixtures of two or more compounds by means of a selective solvent.

Another object of this invention is to provide a method for the separation of relatively more saturated hydrocarbons from those less saturated hydrocarbons contained in mixtures thereof, by extraction with a particular selective solvent.

A further object of this invention is to provide a new and improved solvent for the separation of compounds according to their degree of saturation.

A more specific object of this invention is to separate saturated from unsaturated hydrocarbons through the employment of a new and improved selective solvent which is selective for unsaturated hydrocarbons.

In many cases it is desirable to separate the unsaturated from the saturated hydrocarbons, but this cannot be accomplished by purely fractional distillation means in practical operation because of the similarity in boiling points of the various hydrocarbons. Other organic compounds are likewise recovered from various sources including synthetic processes wherein the products contain organic compounds of different degrees of saturation. For example, saturated and unsaturated glycerides are frequently recovered in admixture and their separation cannot be effected solely by fractional distillation in practical operations.

In a broad aspect the present invention relates to a process for separating a mixture of organic compounds of different degrees of saturation which comprises treating said mixture with a selective solvent comprising a substituted dimethylether of the general formula:

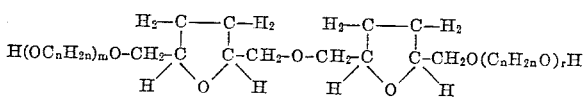

wherein $n$ is a number equal to 2 or 3 and $m$ and $r$ are numbers which may be independently selected from 0, 1, 2, or 3.

In still another aspect the present invention relates to a process for separating a mixture of hydrocarbons having different degrees of saturation and similar boiling points which cannot readily be separated by purely fractional distillation means which comprises treating said hydrocarbons with a solvent comprising a substituted dimethylether of the general formula:

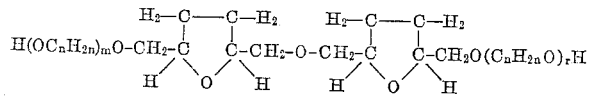

wherein $n$ is a number equal to 2 or 3 and $m$ and $r$ are numbers which may be independently selected from 0, 1, 2 or 3.

The present invention is particularly applicable to the treatment of either normally gaseous or normally liquid hydrocarbon fractions for the separation of relatively unsaturated from relatively saturated hydrocarbons. As used in the present specification and claims, the terms saturated hydrocarbons and unsaturated hydrocarbons are used relative to each other—for example, the term saturated hydrocarbon is intended to include hydrocarbons having a lower molecule ratio of carbon to hydrogen when such hydrocarbons are compared with those of higher ratios; while the term unsaturated hydrocarbon is intended to include hydrocarbons having a higher molecule ratio of carbon to hydrogen when such hydrocarbons are compared with those of lower ratio. The olefins include both the mono and polyolefinic hydrocarbons and may be included either within the saturated hydrocarbons or the unsaturated hydrocarbons depending upon the point of reference—i.e., the type of feed stock being processed and the classes of hydrocarbons which are to be separated.

Thus, the invention may be utilized for the separation of olefins, naphthenes and/or aromatics, polycyclic naphthenes and other polycyclic types from paraffins and/or monocyclic naphthenes, the separation of aromatics from olefins and the separation of naphthenes from paraffins. Likewise, the invention may be utilized for the separation of monoolefins from diolefins, the monoolefins being less unsaturated than the diolefins.

The present invention is characterized by a novel solvent which comprises a substituted dimethylether of the general formula:

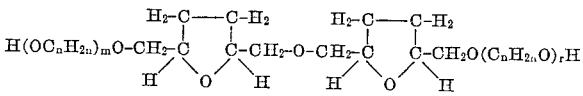

where $n$, $m$ and $r$ are as hereinbefore defined. Such compounds are easily prepared by hydroxymethylation of furfural or furfuryl alcohol, subsequent hydrogenation of the product to 2,5-dihydroxymethyltetrahydrofuran; and etherification of the latter to form sym-di-(5-hydroxymethyl-2-tetrahydrofurfuryl)-dimethylether. The latter may thereafter be oxyalkylated with an appropriate amount of ethylene oxide and/or propylene oxide in the presence of small amounts of an alkaline catalyst, such as sodium acetate or potassium hydroxide.

It is understood that the various alternative compounds which may be employed in accordance with the present invention as hereinbefore set forth are not necessarily equivalent in their effectiveness as a selective solvent for the separation of organic compounds and particularly hydrocarbons. The choice as to a particular solvent to be employed with any given charge stock to be subjected to extraction will depend upon the characteristics of the charge stock and the type of separation to be effected.

The solvents of the present invention are in some cases obtainable in the open market or if a particular solvent is not so obtainable, it may be readily synthesized by well known means, as described hereinbefore.

The operation of the solvent extraction process is relatively simple and may comprise introducing the hydrocarbon mixture to be extracted into a suitable extraction zone. The extraction zone may or may not contain baffle plates, bubble decks, sieve decks, side-to-side pans, or the like. The extraction zone may be equipped with stirring or other contacting means in order to obtain efficient contacting of the hydrocarbons in the solvent. The solvent extraction is effected under conditions of temperature and pressure in order to form an extract phase containing a major portion of the solvent and a major portion of the unsaturated hydrocarbons, and a raffinate phase containing a major portion of the saturated hydrocarbons.

The temperature employed is preferably atmospheric or slightly superatmospheric but it should be high enough to maintain the solvent in the liquid phase in case it is a solid at ordinary temperatures, but must be below that at which the decomposition of the solvent or hydrocarbons occur. Typical temperature ranges are from atmospheric to 500° F. Preferable temperature ranges are from 200° F. to 400° F., depending upon the molecular weight of the hydrocarbon and the water content in the solvent. It is preferable to avoid exposure of the solvent to oxygen or air to prevent undesirable side reactions and equipment fouling problems at said preferable temperature range. Temperatures in excess of 500° F. should be avoided to prevent solvent decomposition. The pressure to be employed is usually atmospheric or moderately superatmospheric but likewise should be sufficient to maintain the hydrocarbons and solvent in liquid phase. When treating normally gaseous hydrocarbons, a higher superatmospheric pressure is employed in order to maintain the hydrocarbons in substantially liquid phase. Typical pressure ranges are from 1 to 70 atmospheres, while preferable ranges are from 3 to 20 atmospheres.

It is within the scope of the invention to add water or similar polar materials to the hydrocarbons and/or solvent when the hydrocarbons are more soluble in the solvent than desirable. Addition of water in this case serves to decrease the solubility of hydrocarbons in the solvent and also to increase the selectivity of the solvent for the unsaturated hydrocarbons. Frequently it is necessary to add water, especially to extract mixtures so rich in aromatics or olefins as to be mutually miscible with the solvent. Typical concentrations of water in said solvent are from 0 to 40 weight percent. Preferable concentrations are from 0.2 to 20 weight percent water in said solvent.

Usually more than one extraction (i.e. several stages) are required in order to effect substantially complete separation of the unsaturated from the saturated hydrocarbons. In some cases, however, one extraction may be sufficient when it is required only to slightly lower the concentration of the unsaturated hydrocarbons in the mixture or in case the charging stock originally contains only a small percentage of unsaturated hydrocarbons.

After formation of the extract and raffinate phases, the solvent may be separated from the hydrocarbons by various means including: (1) distillation at increased temperature and/or reduced pressure; (2) adding water or the like in order to decrease the solubility of the hydrocarbons in the solvent; and (3) counter extracting the hydrocarbons from the solvent by contacting the extract phase with a secondary solvent which is immiscible in the first solvent and which may comprise, for example a paraffinic or napthenic hydrocarbon of higher or lower boiling point than the solute. The second solvent is then separated from the solute by ordinary fractional distillation means.

The following examples are introduced for the purpose of illustrating the novelty and utility of the present invention but not with the intention of limiting the same.

EXAMPLE I

One hundred ml. of test mixture containing 26 volume percent benzene and 74 volume percent methylcyclopentane and 300 ml. of solvent containing about 10.0 weight percent water and about 90.0 weight percent sym-di-(5 - hydroxymethyl - 2 - tetrahydrofurfuryl) - dimethylether are thoroughly agitated at 121° C. in a single stage batch mixing apparatus. On ceasing the agitation a raffinate and extract phase form. The composition of the hydrocarbon portion of the extract phase is about 49.6 volume percent benzene and 50.4 volume percent methylcyclopentane. The concentration of the benzene in the hydrocarbon portion of the raffinate phase is 22.7 volume percent. By additional extractions it is possible to reduce the benzene content in the raffinate to a very low figure.

EXAMPLE II

One hundred ml. of test mixture containing 26 volume percent benzene and 74 volume percent methylcyclopentane and 300 ml. of solvent containing about 5.0 weight percent water and about 95.0 weight percent sym-di-(5-hydroxymethyl-2-tetrahydrofurfuryl)-dimethylether are thoroughly agitated at 121° C. in a single stage batch mixing apparatus. On ceasing the agitation a raffinate and extract phase form. The composition of the hydrocarbon portion of the extract phase is about 45.8 volume percent benzene and 54.2 volume percent methylcyclopentane. The concentration of the benzene in the hydrocarbon portion of the raffinate is 22.0 volume percent. By additional extractions it is possible to reduce the benzene content in the raffinate to a very low figure.

We claim as our invention:

1. A process for separating a mixture of hydrocarbons of differing degrees of saturation which comprises treating said mixture with a selective solvent comprising a substituted dimethylether of the general formula:

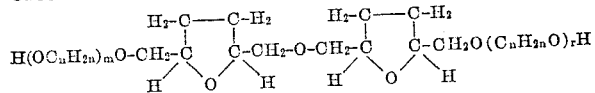

wherein $n$ is a number selected from the group consisting of 2 and 3 and $m$ and $r$ are numbers independently selected from the group consisting of 0, 1, 2 and 3.

2. The process of claim 1 further characterized in that the substituted dimethylether is sym-di-(5-hydroxymethyl-2-tetrahydrofurfuryl)-dimethylether.

3. A process for separating unsaturated from saturated hydrocarbons which comprises treating a mixture of unsaturated and saturated hydrocarbons with a selective solvent comprising a substituted dimethylether of the general formula:

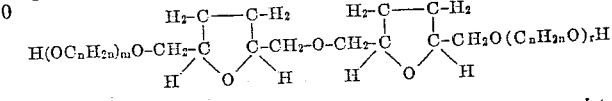

wherein $n$ is a number selected from the group consisting of 2 and 3 and $m$ and $r$ are numbers independently selected from the group consisting of 0, 1, 2 and 3, under conditions to form an extract and a raffinate phase.

4. The process of claim 3 further characterized in that said mixture contains an olefin.

5. The process of claim 3 further characterized in that said mixture contains an aromatic.

6. The procee of claim 3 further characterized in that the mixture comprises at least two hydrocarbon compounds of different degrees of saturation and contains at least one aromatic hydrocarbon and at least one non-aromatic hydrocarbon.

7. A process for separating a mixture of hydrocarbons of differing degrees of saturation which comprises treating said mixture with a selective solvent comprising water and a substituted dimethylether of the general formula:

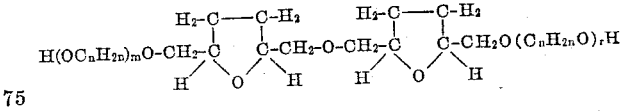

wherein $n$ is a number selected from the group consisting of 2 and 3 and $m$ and $r$ are numbers independently selected from the group consisting of 0, 1, 2 and 3.

8. A process for separating unsaturated hydrocarbons from saturated hydrocarbons which comprises treating a mixture of unsaturated and saturated hydrocarbons with a selective solvent comprising a substituted dimethylether of the general formula:

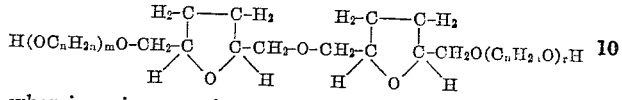

wherein $n$ is a number selected from the group consisting of 2 and 3 and $m$ and $r$ are numbers independently selected from the group consisting of 0, 1, 2 and 3, in a concentration of from about 80 to about 99.8% by weight and water in a concentration of from about 20 to about 0.2% by weight.

References Cited by the Examiner

UNITED STATES PATENTS

| | | | |
|---|---|---|---|
| 1,998,399 | 4/1935 | Pevere | 208—325 |
| 2,799,627 | 7/1957 | Haensel | 208—333 |
| 2,995,581 | 8/1961 | Jones et al. | 260—347.8 |

DELBERT E. GANTZ, *Primary Examiner.*

H. LEVINE, C. E. SPRESSER, JR., *Assistant Examiners.*